Dec. 19, 1967  W. N. BENNETT  3,358,315
FLUID CONDUCTING APPARATUS
Original Filed July 18, 1963
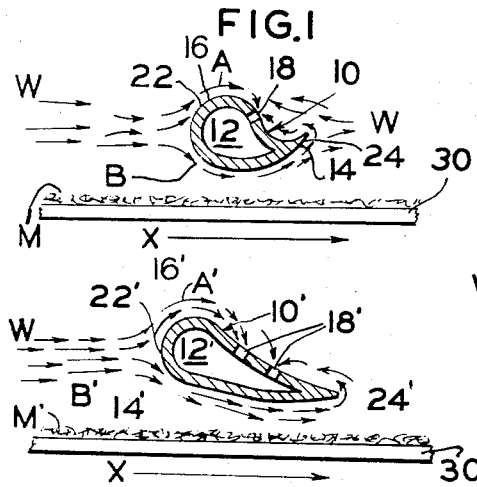
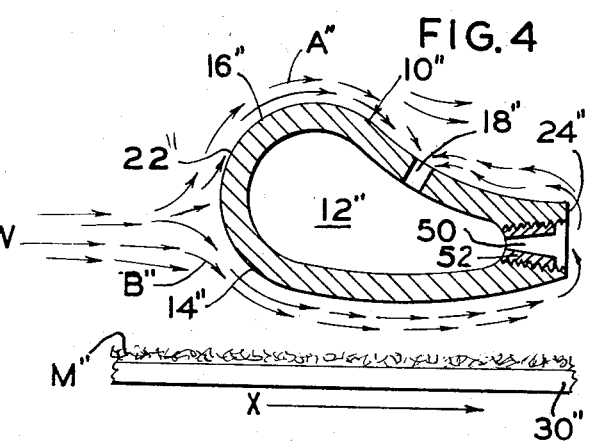
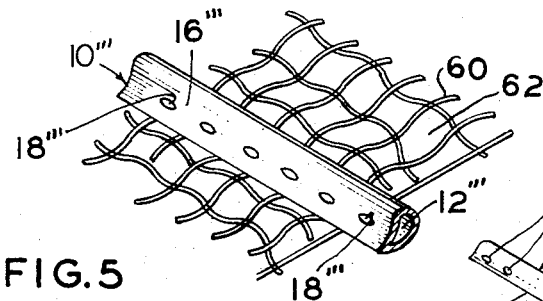
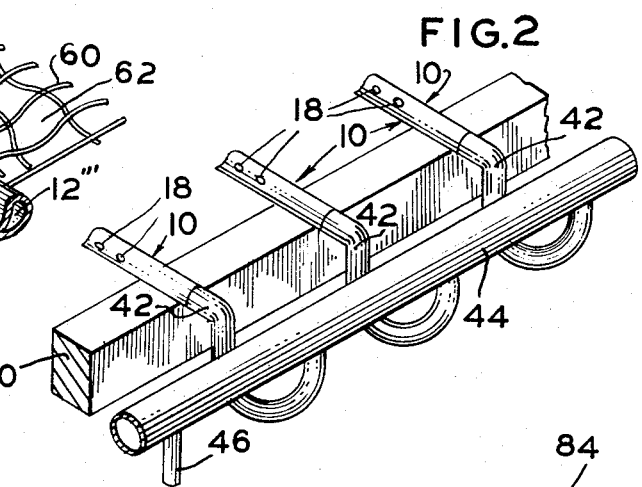
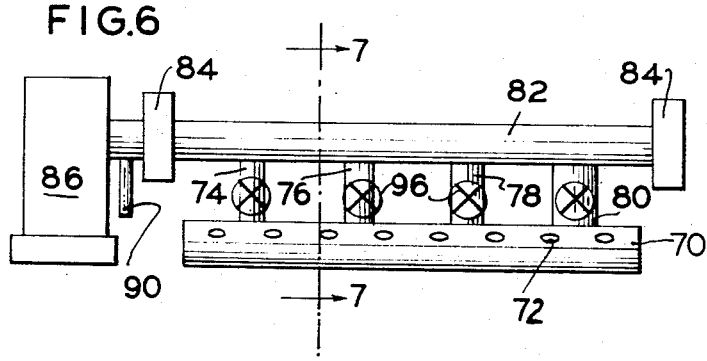
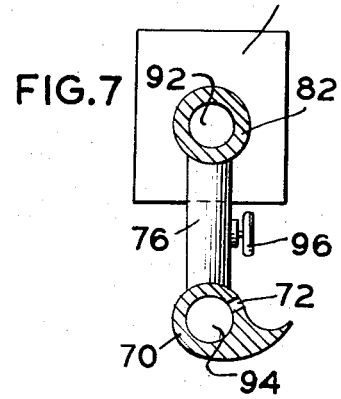
INVENTOR
WILLIAM N. BENNETT
ATTORNEY

United States Patent Office 3,358,315
Patented Dec. 19, 1967

3,358,315
FLUID CONDUCTING APPARATUS
William N. Bennett, Franconia, N.H., assignor to Fitchburg Paper Company, Fitchburg, Mass., a corporation of Delaware
Continuation of applications Ser. No. 295,956, July 18, 1963, and Ser. No. 440,236, Mar. 16, 1965. This application Apr. 14, 1966, Ser. No. 542,505
15 Claims. (Cl. 15—306)

ABSTRACT OF THE DISCLOSURE

This application is a continuation of applicant's co-pending applications Ser. No. 295,956, filed July 18, 1963, now abandoned, and Ser. No. 440,236, filed Mar. 16, 1965, now abandoned.

A tubular member, having in cross section an aerodynamic configuration, is provided with a plurality of apertures along the surface thereof wherein aerodynamic partial pressure is created upon relative movement between the tubular member and a fluid medium, such that a portion of the fluid medium under the influence of the partial pressure moves through the apertures and into the hollow of the tubular member. The fluid is then collected and drawn off through appropriate fluid directing elements disposed at the end of the tubular member. Exhaust means may also be applied to the hollow of the tubular member to assist in drawing the fluid through the apertures and from the hollow of the tubular member. In another embodiment a plurality of tubular members are interconnected to a header provided with suitable exhaust and fluid collecting means. The tubular member is particularly adapted for stationary disposition in a manufacturing environment wherein foreign matter such as moisture or other foreign matter are given off into the atmosphere surrounding the manufacturing station such that the moisture or other foreign matter is collected and carried off to facilitate efficient operation of the manufacturing process.

Background of the invention

This invention relates to fluid conducting apparatus and more particularly to an apparatus utilizing at least one hollow member having in cross section an aerodynamic configuration and one or more apertures disposed at predetermined locations thereon, so as to facilitate the conducting of fluid into and through each such member (or members) upon relative movement between such member and the fluid.

In the carrying out of many manufacturing processes the ambient atmosphere, proximate the location where the process if being conducted, is often required to carry off foreign matter that is emanating from the process. The atmosphere may either be air, gas, or other fluid medium while the foreign matter may be water particles, dust, etc. As the fluid medium becomes saturated with the foreign matter the efficiency of the process is greatly affected and it has therefore become common to interpose some form of apparatus in the vicinity of the location where the process is being carried out to remove such foreign matter saturated fluid medium therefrom. Quite often this interposed apparatus disturbs or otherwise affects the carrying out of the manufacturing process.

In the manufacture of paper, for example, water from the wet paper web is driven off by the use of steam rolls, dielectric energy, or other convenient means, to reduce the moisture content of the paper web to an acceptable amount while the web is moving from the wet end of the paper making machine to the dry end thereof. As the moisture content of the air surrounding the web increases it becomes more and more difficult to drive moisture from the web thus requiring either the application of greater amounts of heat to the web, or the removal of the moisture laden air from the proximity of the web.

The application of greater degrees of heat will of course require additional expenditures for power and will be limited by the capacity of the web to accept such heat without charring or burning. On the other hand a great majority of conventional mechanisms for removing the air from the vicinity of the web must be located at a distance away from the path of web travel, and thus a large amount of free air must also be moved greatly adding to the cost of such a system; in those moisture removal systems which are located in close proximity to the web the suction produced to remove the moisture laden air also produces wrinkles in the web or otherwise upsets the web as it travels along its path. It should be remembered that under average conditions a cubic foot of free air carries about 14 grains of water, or about 500 cubic feet of air per pound of water. Under these conditions a conventional 100 ton open-hooded paper machine will produce about 287 pounds of water per minute and require approximately 143,500 cubic feet of air per minute to remove this moisture from the area. Variables such as a relative humidity, difference in temperature surrounding objects, etc., add to the inconsistency of cost of conventional moisture removal operations.

It is therefore an object of this invention to provide an improved fluid conducting apparatus.

Another object is to provide an improved fluid conducting apparatus which utilizes an applied suction of predetermined magnitude and combines same with the effect of aerodynamic fluid flow to produce a resulting effective suction in excess of the applied suction.

Yet another object is to provide a fluid-conducting apparatus having at least one hollow member of aerodynamic configuration adapted to be disposed in proximity to a location where a manufacturing process is being carried out so that upon relative movement between the atmosphere proximate said location and said member, an aerodynamic fluid flow about said member produces a partial pressure (with respect to atmosphere) to one side thereof and wherein one or more apertures are formed in the partial pressure side of said member to facilitate passage of at least a portion of said atmosphere into and through said member.

A further object is to provide a fluid conducting apparatus having at least one hollow member of external aerodynamics configuration adapted to be disposed proximate the path of travel of a moving web having moisture driven therefrom into the surrounding air, so that the air, as it moves about said member, creates a low pressure area (with respect to the atmosphere) to one side of said member, and wherein one or more apertures are formed in said low pressure side of said member, an exhaust of predetermined magnitude is applied to the hollow in said member to produce an effective suction at said aperture or apertures in excess of that which would otherwise be normally produced by said exhaust to thus conduct said moisture laden air away from said web path.

A still further object is to provide an improved apparatus for conducting moisture laden air away from a traveling paper web as moisture is driven therefrom during the manufacture thereof.

In carrying out this invention according to a preferred embodiment one or more hollow tubes, each formed with an aerodynamic configuration and each provided with a plurality of apertures formed in a side of the tube which would normally be subjected to a low pressure (lower than atmosphere) due to an aerodynamic fluid flow about said tube, are located in close proximity to the path of travel of a moving web during a phase of processing of the web when moisture is being driven from the web into the surrounding air. An exhaust applied to each tube either by an exhaust mechanism located at the end of each tube or, in the alternative, through a header interconnecting a plurality of such tubes, produces a suction of predetermined magnitude within each such tube. This suction combines with the decrease in pressure on the low pressure side of the tube to facilitate the movement of the moisture laden air through the apertures formed in the tube, and therefrom to a collection device. These fluid conducting tubes can be located in areas where the moisture content of the air is high and can operate to remove such moisture laden air without disturbing the web (or other process) to thus permit fresh air to move into proximity with the web to pick up additional moisture as it is driven therefrom thereby providing a moisture removal apparatus of high efficiency operating with a minimum amount of air movement.

The features and advantages of the invention will be seen from the above, from the following description of the preferred embodiment when considered in conjunction with the drawings, and from the claims.

In the drawings:

FIG. 1 shows a sectional view of a fluid conducting member of aerodynamic cross section embodying the present invention;

FIG. 2 shows a perspective view of a plurality of fluid conducting members similar to those of FIG. 1 each interconnected to a common collecting pipe;

FIG. 3 shows a sectional view of a fluid conducting member similar to that of FIG. 1 but having a different aerodynamic cross section;

FIG. 4 shows yet another fluid conducting member similar to that of FIGS. 1 and 2 but with still a different aerodynamic cross section;

FIG. 5 shows a fluid conducting member similar to that of FIGS. 1, 2, and 3 disposed proximate the path of travel of a moving web of open weave construction;

FIG. 6 shows a fluid conducting member similar in aerodynamic configuration to that of FIG. 1 interconnected by a plurality of valve controlled tubes to a common collecting tube journalled for rotary motion; and FIG. 7 is an enlarged elevational view in partial section of the apparatus of FIG. 6 taken along line 7—7 of FIG. 6.

For convenience the invention will be described in conjunction with a manufacturing process wherein a web of material, such as, paper, textiles, film, etc., having just been formed, coated, or otherwise treated is in a wet state, and is moving through a phase in its manufacturing process wherein moisture is being driven from the wet web into the surrounding atmosphere. It being understood, nevertheless, that without departing from the scope of the invention that subject apparatus could be just as easily utilized in any manufacturing process wherein discreet articles are passing (as on a belt) through a manufacturing phase wherein moisture is being driven from the articles into the surrounding atmosphere; or in any other manufacturing process wherein matter driven into the surrounding atmosphere must be removed therefrom in order to facilitate continuation of the process. While no particular form of energy source is shown for driving the moisture from the web (or articles, etc.) into the surrounding atmosphere it should be understood that this might be accomplished through the use of conventional apparatus, such as steam rolls, dielectric heating apparatus, etc.

With reference to FIG. 1 the number 10 generally designates a fluid conducting tube formed with a hollow 12 and an external cross section configuration providing a first surface 14 and a second surface 16. One or more apertures 18 are formed in surface 16.

Tube 10 is adapted for disposition in close proximity to the path of travel of a web 30 which, during a particular phase in the processing thereof, is moved in the direction of an arrow X. As web 30 moves in the direction of arrow X the air W located thereabout also moves in the direction of arrow X until it encounters a blunt end 22 of tube 10 at which time air W must move either in the direction of arrow A or in the direction of arrow B until it passes a trailing edge 24 of tube 10.

Tube 10 is formed so that the distance along surface 14 from blunt end 22 to trailing edge 24, in the direction of arrow B, is less than the distance along surface 16 between blunt end 22 and trailing edge 24 in the direction of arrow A; thus providing an aerodynamic configuration.

As air W passes around tube 10 it moves faster in the direction of arrow A than in the direction of arrow B and creates a partial pressure along surface 16.

Web 30, as it moves in the direction of arrow X, is passing from a phase of a manufacturing process during which web 30 may have been formed or has just been coated, or has otherwise been treated, so that its moisture content is extremely high. It is passing to a phase in the manufacturing process wherein such moisture content must be reduced to either nothing or a predetermined amount less than what it is presently at. As such, moisture M must be driven from web 30 through the use of suitable means such as steam drying rolls, dielectric heating equipment, or other appropriate mechanisms; none of which have been shown since they do not enter into the scope of the present invention. As such moisture as M enters the air surrounding web 30 it is picked up by air W as it moves in the direction of arrow X and thereafter moves along with air W in the directions of arrows A and B.

A suction of predetermined magnitude is applied to hollow 12 of tube 10 by suitable means (not shown).

The partial pressure resulting from the aerodynamic flow of air currents W about tube 10 and the suction produced in hollow 12, and therefore at apertures 18, combines to effectively draw into hollow 12 of tube 10 a significant amount of the moisture laden air surrounding tube 10 thus permitting free air to move into the vicinity of web 30 to pick up moisture M as it is being driven from web 30.

The disposition of tube 10 with respect to web 30 is such that tube 10 is disposed where the moisture content of the air surrounding web 30 is highly concentrated and thus the air which is drawn into hollow 12 of tube 10 is heavily laden with moisture so that the system is operating in a highly efficient manner and is not expanding power to move a lot of air which is not moisture laden or wherein the moisture level is low. At the same time, the coaction between tubes 10 and the air surrounding web 30 is such that web 30 can continue along in the direction of arrow X without in any way being disturbed by the operation thereof thus greatly minimizing rips, tears, and wrinkles in web 30.

The moisture which collects in the hollow 12 of tube 10 may be drawn off and drained by any suitable means to permit additional moisture laden air to be drawn therein and additional moisture to be withdrawn therefrom.

It is of course obvious that a plurality of fluid conducting tubes 10 may be disposed along the path of travel of web 30, or in any other convenient location in the manufacturing process where the ambient atmosphere must be exhausted therefrom, and that each of said tubes 10 may have its own individual exhaust or suction mechanism and its own individual draining mechanism. In the alternative tubes 10 may be interconnected together by suitable means to provide a common exhaust and draining mechanism, as for example that which is shown in FIG. 2 wherein a plurality of tubes 10, each formed with apertures 18, are supported at their respective ends by a support bar 40, or other suitable supporting structure. A tube 42 of either flexible or fixed construction is connected to the end of each fluid conducting tube 10 with either a plurality, or all of such tubes 42, in turn connected to a header pipe 44. A drainpipe 46 is suitably disposed in header pipe 44 to provide a passage for the moisture collecting within header pipe 44 from pipe 44 to any suitable draining source. The exhaust mechanism (not shown) may be conveniently disposed to exhaust header pipe 44, and through tubes 42, the respective fluid conducting tubes 10.

The aerodynamic configuration of tube 10 may take many forms as for example that shown in FIG. 3 wherein the number 10' generally designates a fluid conducting tube formed with a hollow 12' and an external cross section configuration providing a first surface 14' and a second surface 16'. One or more sets of apertures 18' are formed in surface 16'.

Tube 10' like tube 10 of FIG. 1 is adapted for disposition in close proximity to the path of travel of a web 30' which during a particular phase of processing thereof is moved in the direction of arrow X. As web 30' moves in the direction of arrow X the air W located thereabout also moves in the direction of arrow X until it encounters a blunt end 22' of tube 10' at which time air W must move either in the direction of arrow A' or in the direction of arrow B' until it passes a trailing edge 24' of tube 10'.

Tube 10' is formed so that the distance, along surface 14' from blunt end 22' to trailing edge 24', in the direction of arrow B', is less than the distance along surface 16' between blunt end 22' and trailing edge 24', in the direction of arrow A', thus providing an aerodynamic configuration for tube 10'.

As air W passes around tube 10' it moves faster in the direction of arrow A' than in the direction of arrow B' and thus creates a partial pressure along surface 16'.

Web 30' is also passing through a manufacturing phase wherein moisture M' is driven therefrom into the surrounding air. As moisture M' enters the air surrounding web 30' it is picked up by air W as it moves in the direction of arrow X and thereafter moves along with air W in the directions of arrows A' and B'.

As in the embodiment of FIG. 1 a suction of predetermined magnitude is applied to hollow 12' of tube 10' by suitable means (not shown).

The partial pressure resulting from the aerodynamic flow of air currents W about tube 10' and the suction produced in hollow 12', and therefore at apertures 18', combine to effectively draw into hollow 12' of tube 10' a significant amount of the moisture laden air surrounding tube 10' thus permitting free air to move into the vicinity of web 30' to pick up moisture M' as it is being driven from web 30'.

Tube 10' is also adapted to be disposed where the moisture content of the air surrounding web 30' is highly concentrated and thus the air which is drawn into the hollow 12' of tube 10' is heavily laden with moisture so that the system is operating in a highly efficient manner and is not expending power to move a lot of air which is not moisture laden.

The moisture which collects in the hollow 12' of tube 10' may be drawn off by any suitable means to permit additional moisture laden air to be drawn therein and additional moisture to be withdrawn therefrom.

A plurality of tubes 10' may be grouped as shown in FIG. 2 for tubes 10. In addition it should be obvious that a common header pipe, such as header pipe 44, may be provided for such a grouping of tubes 10' and that a drain such as drain 46 may also be provided therefore.

The fluid conducting tube 10" of FIG. 4 is formed with a hollow 12" and an external cross section configuration providing a first surface 14" and a second surface 16". One or more apertures 18" are formed in surface 16".

Tube 10" like tube 10 of FIG. 1 and tube 10' of FIG. 3 is adapted for disposition in close proximity to the path of travel of a web 30" which during a particular phase of processing thereof is moved in the direction of arrow X. As web 30" moves in the direction of arrow X the air W located thereabout also moves in the direction of arrow X until it encounters a blunt end 22" of tube 10" at which time air W must move either in the direction of arrow A" or in the direction of arrow B" until it passes a trailing edge 24" of tube 10".

Tube 10" is formed so that the distance along surface 14" from blunt end 22" to trailing edge 24" in the direction of arrow B" is less than the distance along surface 16" between blunt end 22" and trailing edge 24" in the direction of arrow A", thus providing an aerodynamic configuration.

An aperture 50, disposed in trailing edge 24", is formed to receive a conventional type venturi 52.

As air W passes around tube 10" it moves faster in the direction of arrow A" than in the direction of arrow B" and thus creates a partial pressure along surface 16".

As moisture M" enters the air surrounding web 30" it is picked up by air W as it moves in the direction of arrow X and thereafter moves along with air W in the direction of arrows A" and B" until it passes trailing edge 24" of tube 10". As in the embodiments of FIGS. 1 and 3 suction of predetermined magnitude is applied to hollow 12" of tube 10" by suitable means (not shown).

The partial pressure resulting from the aerodynamic flow of air currents W about tube 10" and the suction produced in hollow 12" and therefore at apertures 18" and 52, combine to effectively draw into hollow 12" of tube 10" a significant amount of the moisture laden air surrounding tube 10" thus permitting free air to move into the vicinity of web 30" to pick up moisture M" as it is being driven from web 30".

Tube 10" is also adapted to be disposed where the moisture content of the air surrounding web 30" is highly concentrated and thus the air which is drawn into the hollow 12" of tube 10" is heavily laden with moisture so that the system is operating in a highly efficient manner and is not expending power to move a lot of air which is not moisture laden.

The moisture which collects in the hollow 12" of tube 10" may be drawn off by any suitable means to permit additional moisture laden air to be drawn therein and additional moisture to be withdrawn therefrom. In addition it should be obvious that a plurality of tubes 10" may be grouped together (as in FIG. 2) and may be provided with a common header pipe, drain and suction system (as in FIG. 2).

In FIG. 5 there is shown a fluid conducting tube 10''' formed with apertures 18''' disposed in proximity to an open weave type web 60 formed with interstices 62.

Open weave type webs such as web 60, formed from water resistant synthetics, have been finding considerable use in manufacturing processes where a web while being manufactured must be held by another web against a drying mechanism, and as such have been replacing conventional type absorbent mill felts. A mill felt generally had two uses, that of holding the traveling web against the drying mechanism to increase the efficiency of heat transfer therefrom to the paper, and that of absorbing moisture from the wet web. However, the wet felt web also had to be dried. By replacing the absorbent type mill felts with open woven nonabsorbent synthetic webs, such as web 60, the function of holding the wet web against the drying mechanism, is still carried out. The moisture that is driven from the wet web is allowed to penetrate through the open weave or interstices 62 to the free air, thereby increasing the efficiency of the drying mechanism. The open woven web, however, need not be itself dried as was required for the mill felt.

However, the very nature of the open weave, traveling at the higher speeds of today's processing equipment, creates moisture filled pockets in the interstices 62 of the open web 60, and presents a problem in accomplishing the removal thereof.

Here again, by locating the fluid conducting tube 10''' in close proximity to the path of travel of web 60, the moisture laden air, which is set in motion by the movement of web 60, passes around tube 10''' in the same manner that the moisture laden air passes around tubes 10, 10' and 10''. By providing a suction (through suitable means not shown) to the hollow 12''' within tube 10''' such moisture laden air is quickly and efficiently drawn off permitting fresh air to move in and about web 60 drawing the pockets of moisture from the interstices 62 and thus permitting web 60 to more efficiently perform its function in the manufacturing processes.

It should be obvious that plurality of tubes 10''' may be associated with a common header, drain means, and suction means, as shown in FIG. 2.

In FIGS. 6 and 7 a fluid conducting tube 70, similar in configuration to fluid conducting tube 10 of FIG. 1, is shown formed with a plurality of apertures 72 and interconnected by a plurality of pipes 74, 76, 78, and 80 to a common header pipe 82. A pair of journals 84, support header pipe 82 for rotation about an axis passing through the center thereof and for coaction with an exhaust mechanism 86 of suitable conventional construction. A drainpipe 90 is carried by header pipe 82 to facilitate the passage of any moisture that may collect in pipe 82 to any other suitable receptacle. It should be noted that header pipe 82 is formed with a hollow 92 and is interconnected through pipes 74, 76, 78, and 80 to a hollow 94 formed in fluid conducting pipe 70, which is of course closed at its ends.

Tubes 74, 76, 78, and 80 are each provided with a valve 96 but are respectively formed with increasing diameters so that any suction applied to hollow 92 of header pipe 82 may be evenly distributed to hollow 94 of fluid conducting pipe 70.

Fluid conducting pipe 70 is of course adapted for disposition in proximity to the path of travel of a web in a manner similar to that shown for the embodiments of FIGS. 1, 2, 3, 4, and 5.

From the above description it will thus be seen that a novel and improved fluid conducting apparatus has been provided which combines the effects of aerodynamic fluid flow and an applied suction of a predetermined magnitude, to produce an effective suction in excess of said applied suction of predetermined magnitude; and that such fluid conducting apparatus can be disposed effectively and efficiently in a fluid medium carrying foreign matter where such foreign matter is highly concentrated to remove such fluid medium and thus permit fresh fluid medium to replace said removed fluid medium so as to be ready to accept additional foreign matter and facilitate an efficient operation of the manufacturing process.

The embodiments of the invention in which an exclusive property or privilege is claimed, are defined as follows:

1. A fluid conducting apparatus adapted to be disposed in a fluid medium comprising:
    (a) a tubular member;
    (b) said member having a transverse cross section of a substantially aerodynamic configuration, such that upon the relative movement between said transverse cross section of said tubular member and a fluid, a portion of the fluid follows a first path adjacent a first surface of said cross section of said tubular member and another portion of the fluid follows a second path adjacent a second surface of said cross section of said tubular member;
    (c) said first path having a longer distance, as measured along said first surface, than said second path, as measured along said second surface, thus producing an aerodynamic fluid flow about the cross section of said tubular member and creating an area of partial pressure adjacent said first surface of said cross section of said tubular member;
    (d) one or more apertures formed in said first surface of said cross section of said tubular member;
    (e) each such aperture providing a fluid path from said first surface of said cross section of said tubular member to the hollow within said tubular member to collect fluid therewithin; and
    (f) fluid directing means disposed proximate an end of said tubular member to direct any fluid collected within said hollow of said tubular member away from said tubular member and the fluid medium within which said tubular member is disposed.

2. The fluid conducting apparatus of claim 1; including an exhaust mechanism disposed for coaction with said tubular member to apply a suction of predetermined magnitude to the hollow thereof and therefrom to each of said apertures.

3. The fluid conducting apparatus of claim 1 including:
    (a) a plurality of tubular members;
    (b) a hollow pipe;
    (c) tube means connecting each of said tubular members to said hollow pipe; and
    (d) an exhaust mechanism disposed for coaction with said pipe to apply a suction of predetermined magnitude to the hollow thereof and therefrom through each of said tubes to each of said tubular members and apertures formed therein.

4. The fluid conducting apparatus of claim 2 wherein:
    (a) said tubular member is adapted for disposition in close proximity to a predetermined location in a manufacturing process wherein foreign matter is being driven off into a fluid surrounding said location; and
    (b) said suction and said aerodynamic fluid flow combining to draw at least some of said fluid into said hollow of said tubular member.

5. The fluid conducting apparatus of claim 4 wherein:
    (a) said fluid is air; and
    (b) said foreign matter is moisture.

6. A fluid conducting apparatus adapted to be disposed in close proximity to a predetermined location and a manufacturing process wherein a wet web of material moves along a predetermined path and during which moisture is driven from said web of said material into the fluid surrounding said location comprising:
    (a) a tubular member extending across said predetermined path a distance sufficient to span the web of material;
    (b) said tubular member having a transverse cross section of a substantially aerodynamic configuration such that upon the relative movement between said transverse cross section of said tubular member and the moisture laden fluid at said location a portion of the fluid follows a first path adjacent a first surface of said cross section of said tubular member and another portion of said fluid follows a second path adjacent a second surface of said cross section of said tubular member;
    (c) said first path having a longer distance, as measured along said first surface then said second path, as measured along said second surface, thus producing an aerodynamic fluid flow about the cross section of said tubular member and creating an area of partial pressure adjacent to said first surface of said cross section of said tubular member;
    (d) one or more apertures formed in said first surface of said cross section of said tubular members;
    (e) each such aperture providing a fluid path from said first surface of said cross section of said tubular member to the hollow within said tubular members;
    (f) an exhaust mechanism disposed for coaction with said tubular members to apply a suction of predetermined magnitude to the hollow thereof and therefrom to each of said apertures; and
    (g) said suction and said aerodynamic fluid flow combining to draw at least some of said moisture laden fluid into said hollow of said tubular member.

7. The fluid conducting apparatus of claim 6 wherein said tubular member is positioned with said one first surface facing away from said predetermined path.

8. The fluid conducting apparatus of claim 7 wherein:
    (a) said tubular member is of a substantially tear drop configuration having a blunt end and a pointed end; and
    (b) said pointed end points in the direction of movement of the web.

9. The fluid conducting apparatus of claim 6 wherein said wet web is paper in the process of being formed.

10. The fluid conducting apparatus of claim 6 wherein said wet web is paper in the process of being coated.

11. The fluid conducting apparatus of claim 6 wherein
    (a) said wet web is of open weave construction; and
    (b) said wetness including pockets of moisture in the openings of the weave of the web.

12. The fluid conducting apparatus of claim 1 wherein one or more of said apertures includes a venturi.

13. A fluid conducting apparatus adapted to be disposed in a fluid medium comprising:
    (a) a tubular member;
    (b) said tubular member having a transverse cross section of a substantially aerodynamic configuration such that upon the relative movement between said transverse cross section of said tubular member and a fluid, a portion of the fluid follows a first path adjacent a first surface of said cross section of said tubular member and another portion of the fluid follows a second path adjacent a second surface of said cross section of said tubular member;
    (c) said first path having a longer distance, as measured along said first surface, than said second path, as measured along said second surface, thus producing an aerodynamic fluid flow about the cross section of said tubular member and creating an area of partial pressure adjacent said first surface of said cross section of said tubular member;
    (d) one or more apertures formed in said first surface of said cross section of said tubular member;
    (e) each such aperture prividing a fluid path from said first surface of said cross section of said tubular member to the hollow within said tubular member;
    (f) a rotatably journaled hollow collecting pipe;
    (g) a plurality of tubes of successively increasingly diameter interconnecting the hollow of said collecting pipe to the hollow of said tubular member;
    (h) an adjustable valve in each of said tubes; and
    (i) means for applying an exhaust of predetermined magnitude to the hollow of said collecting pipe.

14. The fluid conducting apparatus of claim 1 wherein said first surface of said tubular member follows a substantial concaved configuration.

15. The fluid conducting apparatus of claim 1 wherein: there are a plurality of small circular apertures longitudinally disposed across said tubular member in spaced relationship with respect to each other.

References Cited
UNITED STATES PATENTS

| | | | |
|---|---|---|---|
| 2,041,786 | 5/1936 | Stalker | 244—42.48 |
| 2,073,654 | 3/1937 | Smiley | 162—208 X |
| 2,095,471 | 10/1937 | Hayward | 34—160 |
| 2,142,711 | 1/1939 | Birch | 34—160 X |
| 2,406,919 | 9/1946 | Stalker. | |
| 2,574,844 | 11/1951 | Roden | 34—160 X |
| 2,894,703 | 7/1959 | Hazen et al. | 244—42.47 |

JAMES W. WESTHAVER, *Primary Examiner.*

FREDERICK L. MATTESON, JR., *Examiner.*

A. D. HERRMANN, *Assistant Examiner.*